United States Patent
Ho et al.

(10) Patent No.: US 9,768,860 B2
(45) Date of Patent: Sep. 19, 2017

(54) METHOD AND SYSTEM FOR HIGH BANDWIDTH AND LOW POWER BODY CHANNEL COMMUNICATION

(71) Applicant: Agency for Science, Technology and Research, Singapore (SG)

(72) Inventors: Chee Keong Ho, Singaore (SG); Xin Liu, Singapore (SG); Minkyu Je, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 212 days.

(21) Appl. No.: 14/021,146

(22) Filed: Sep. 9, 2013

(65) Prior Publication Data

US 2014/0071801 A1   Mar. 13, 2014

(30) Foreign Application Priority Data

Sep. 7, 2012  (SG) ................................ 201206663-5

(51) Int. Cl.
*H04B 7/24* (2006.01)
*H04J 13/00* (2011.01)
(52) U.S. Cl.
CPC ............ *H04B 7/24* (2013.01); *H04J 13/0048* (2013.01)
(58) Field of Classification Search
None
See application file for complete search history.

(56) References Cited

U.S. PATENT DOCUMENTS

| | | | | |
|---|---|---|---|---|
| 5,535,239 | A * | 7/1996 | Padovani | H04B 1/707 370/209 |
| 5,966,377 | A * | 10/1999 | Murai | 370/342 |
| 6,101,176 | A * | 8/2000 | Honkasalo et al. | 370/335 |
| 6,185,246 | B1 * | 2/2001 | Gilhousen | 375/130 |
| 6,205,190 | B1 * | 3/2001 | Antonio | H04B 15/00 370/318 |

(Continued)

*Primary Examiner* — Chirag Shah
*Assistant Examiner* — Joshua Smith
(74) *Attorney, Agent, or Firm* — Schwegman Lundberg & Woessner, P.A.

(57) ABSTRACT

A system and method for body channel communication is provided. The system includes a transceiver which encodes multiple bits per symbol when operating in a high data rate mode by selecting a first Walsh code in response to a first set of multiple bits of data and selecting a second Walsh code in response to a second set of multiple bits of data, both Walsh codes selected from a multiple-bit Walsh code sequence. The transceiver also generates a multi-level transmission signal having a predetermined symbol frequency by stacking the first Walsh code onto the second Walsh code, and transmits the multi-level signal having the first predetermined symbol frequency through the body channel. The transceiver also has additional modes of operation which include a normal mode and a low power mode, the low power mode decoding the multiple bits from the signal in response to harmonic energy from a harmonic frequency generated by the multiple-bit Walsh code sequence. Also, the transceiver modulates an M-Sequence code with the multi-bit Walsh code sequence up to a desired frequency band associated with the predetermined frequency in order to improve auto-correlation after passing through the body channel.

13 Claims, 10 Drawing Sheets

(56) References Cited

U.S. PATENT DOCUMENTS

| | | | |
|---|---|---|---|
| 6,285,669 B1* | 9/2001 | Gutierrez | 370/335 |
| 6,389,000 B1* | 5/2002 | Jou | 370/342 |
| 6,724,740 B1* | 4/2004 | Choi et al. | 370/335 |
| 7,394,792 B1* | 7/2008 | von der Embse | 370/335 |
| 2002/0123358 A1* | 9/2002 | Butler | H04W 68/00 455/458 |
| 2003/0036359 A1* | 2/2003 | Dent et al. | 455/63 |
| 2003/0063583 A1* | 4/2003 | Padovani et al. | 370/329 |
| 2004/0258024 A1* | 12/2004 | Tiedemann, Jr. | H04W 52/40 370/332 |
| 2010/0272159 A1* | 10/2010 | Lim et al. | 375/146 |
| 2011/0064161 A1* | 3/2011 | Lim et al. | 375/295 |
| 2012/0051417 A1* | 3/2012 | Yip | 375/232 |
| 2012/0057535 A1* | 3/2012 | Zhang et al. | 370/329 |
| 2012/0170482 A1* | 7/2012 | Hwang et al. | 370/252 |
| 2012/0176885 A1* | 7/2012 | Lee et al. | 370/209 |
| 2012/0213111 A1* | 8/2012 | Shimezawa | H04L 1/0026 370/252 |
| 2012/0213148 A1* | 8/2012 | Saito et al. | 370/315 |
| 2012/0307760 A1* | 12/2012 | Han | H04L 5/001 370/329 |

* cited by examiner

METHOD AND SYSTEM FOR HIGH BANDWIDTH AND LOW POWER BODY CHANNEL COMMUNICATION

PRIORITY CLAIM

This application claims the benefit of priority of Singapore Patent Application No. 201206663-5, filed 7 Sep. 2012, the benefit of priority of which is claimed hereby, and which is incorporated by reference herein in its entirety.

FIELD OF THE INVENTION

The present invention generally relates to body channel communication, and more particularly relates to a system and method for high bandwidth efficient low power Walsh code implemented body channel communication.

BACKGROUND

In recent years, intra-body communication within human bodies using body channel communication has been developed for wearable and implantable biomedical devices and for data transfer through the human body. In general, body channel communication (BCC) is a form of wireless communication that uses the human body as the transmission medium. The signal is transmitted from a transmitter electrode through the human body to one or more receiver electrodes located on other parts of the body. BCC is attractive as signal attenuation through the human body is lower than signal attenuation through the air. In addition, the ability to support higher data rates and achieve lower power consumption gives BCC an edge over conventional wireless communication scheme such as Bluetooth for wireless body area network (WBAN) applications.

In most WBAN applications, the power consumption requirement for the transmitter is more stringent than that of the receiver, as typically the transmitter is either powered up wirelessly or operated with a smaller battery. BCC transceivers based on adaptive frequency hopping methods, dual band architectures, double frequency shift keying (FSK) modulation schemes, and direct digital architectures have been proposed. Among the proposed BCC transceivers, the direct digital architecture has the simplest and lowest power consumption transmitter design. Although, the direct digital architecture has the advantage of simple and low power transmitter architecture, it lacks the frequency selective ability to avoid strong interferences, and the data scalability necessary to meet high data rate requirements (>25 Mbps) for applications such as multi-channel neural recording.

One possibility to overcome the limitations of direct digital transceivers is to incorporate Walsh code into the baseband transceiver architecture. The frequency selective nature of the Walsh code provides the direct digital transceiver with interference avoidance capability, while the orthogonal characteristic of the Walsh spreading code allows for summation of codes to achieve higher data rate in band limited channel. Thus, integrating Walsh codes with baseband transceiver architectures allows for low power, bandwidth efficient, frequency selective and high data rate implementation of direct digital BCC transceivers. However, to utilize the entire usable body channel bandwidth of up to 80 MHz, the Walsh code baseband transceiver is required to operate at 160 MHz.

Thus, what is needed is a system and method for body channel communication baseband transceiver operation that supports both low power and high data rate modes while operating in the electric-field intra-body channel (40 MHz to 80 MHz). Furthermore, other desirable features and characteristics will become apparent from the subsequent detailed description and the appended claims, taken in conjunction with the accompanying drawings and this background of the disclosure.

SUMMARY

According to the Detailed Description, a system for body channel communication is provided. The system includes a transmitter having a Walsh code selector module, an amplification circuit and an electrode. The system also includes a receiver having an electrode, a level detector and a digital baseband. The Walsh code selector module has a high data rate mode of operation and encodes multiple bits per symbol when operating in the high data rate mode by selecting a first Walsh code from a multiple-bit Walsh code sequence in response to a first set of multiple bits of data and selecting a second Walsh code from the multiple-bit Walsh code sequence in response to a second set of multiple bits of data. The amplification circuit is coupled to the Walsh code selector module and has a high data rate mode for receiving the first Walsh code and the second Walsh code and generating therefrom a multi-level transmission signal having a predetermined symbol frequency by stacking the first Walsh code onto the second Walsh code to form the multi-level signal having the first predetermined symbol frequency. The transmitter's electrode is coupled to a body channel for transmitting the multi-level signal having the first predetermined symbol frequency through the body channel and the receiver's electrode is coupled to the body channel for receiving the multi-level signal having the first predetermined symbol frequency. The level detector is coupled to the electrode for detecting levels of the multi-level signal and the digital baseband derives the first set of multiple bits and the second set of multiple bits from the levels of the multi-level signal.

In accordance with another aspect, a transmitter for body channel communication including a Walsh code selector module, an amplification circuit and an electrode is provided. The Walsh code selector module has a high data rate mode and encodes multiple bits per symbol when operating in the high data rate mode by selecting a first Walsh code selected from a multiple-bit Walsh code sequence in response to a first set of multiple bits of data and selecting a second Walsh code selected from the multiple-bit Walsh code sequence in response to a second set of multiple bits of data. The amplification circuit is coupled to the Walsh code selector module and has a high data rate mode for receiving the first Walsh code and the second Walsh code and generating therefrom a multi-level transmission signal having a predetermined symbol frequency by stacking the first Walsh code onto the second Walsh code to form the multi-level signal having the first predetermined symbol frequency. The electrode is coupled to a body channel for transmitting the signal having the first predetermined symbol frequency through the body channel.

In accordance with yet another aspect, a method for body channel communication through a body channel is provided. The method includes encoding multiple bits per symbol when operating in the high data rate mode by selecting a first Walsh code selected from a multiple-bit Walsh code sequence in response to a first set of multiple bits of data and selecting a second Walsh code selected from the multiple-bit Walsh code sequence in response to a second set of multiple bits of data, generating a multi-level transmission signal having a predetermined symbol frequency by stacking the first Walsh code onto the second Walsh code to form the multi-level signal having the first predetermined symbol frequency, and transmitting the multi-level signal having the first predetermined symbol frequency through the body channel.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 4, comprising FIGS. 4A and 4B, depicts normal operation of the transceiver of FIG. 3 in accordance with the present embodiment, wherein

FIG. 5, comprising FIGS. 5A and 5B, depicts high data rate mode operation of the transceiver of FIG. 3 in accordance with the present embodiment, wherein

FIG. 7, comprising FIGS. 7A, 7B and 7C, depicts signaling of conventional Walsh code systems clocked at a frequency of 160 MHz, wherein

FIG. 8, comprising FIGS. 8A, 8B and 8C, depicts reduced clock rate signaling of the Walsh code system in accordance with the present embodiment when clocked at the reduced clock rate of 80 MHz, wherein

FIG. 10, comprising FIGS. 10A and 10B, depicts a conventional 32-bit M-sequence code for synchronization, wherein

FIG. 11, comprising FIGS. 11A and 11B, depicts a 32-bit M-sequence code combined with Walsh code for synchronization in accordance with the present embodiment, wherein

Skilled artisans will appreciate that elements in the figures are illustrated for simplicity and clarity and have not necessarily been depicted to scale. For example, the dimensions of some of the elements in the block diagrams or flowcharts may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of this invention to present a flexible baseband transceiver architecture that supports both low power and high data rate mode while operating in electric-field intra-body channel (40 MHz to 80 MHz). The transceiver operates at full clock rate in high data rate mode, and runs at 50% clock rate in low data rate mode. As the power consumption is proportional to the clock rate, reducing the clock frequency by half leads to a power consumption reduction of approximately 50%. In the reduced clock rate mode, the receiver harvests the energy from the harmonics of the transmitted Walsh spread signal instead of the fundamental frequency as the harmonics energy is more dominant than the fundamental frequency as the electric-field intra-body channel exhibits band pass filter characteristics.

Figure 1:
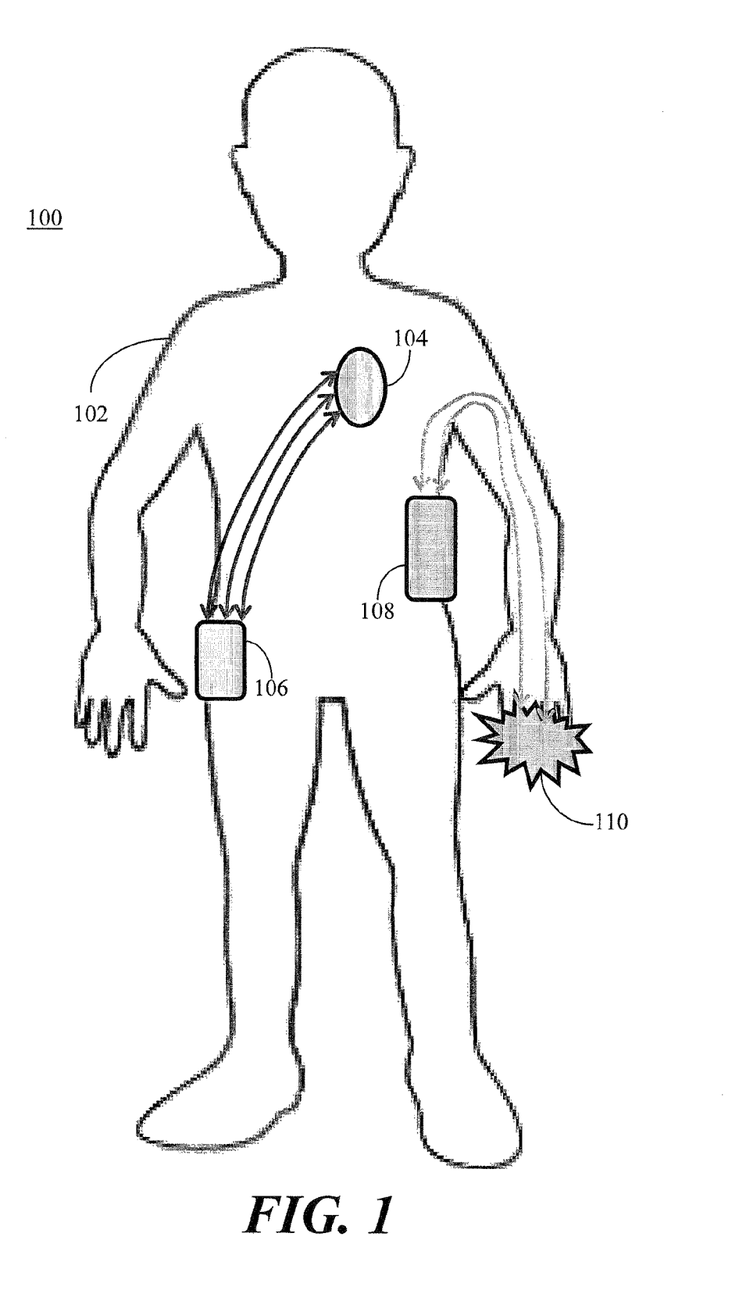
FIG. 1 depicts a diagram illustrating an overview of a system for body channel communication in accordance with an embodiment.

Referring to FIG. 1, a body channel communication system 100 wireless communication in accordance with a present embodiment uses a human body channel 102 as the transmission medium for wireless communication. For example, an internal transceiver device 104 within the body channel 102 may wirelessly communicate with a transceiver device 106 externally connected to the body channel 102. Such a system may, for example, allow a biomedical device such as an endoscopic device with the transceiver 104 to transmit data and/or receive instructions from the transceiver device 106. In another example pictured in FIG. 1, a transceiver device 108 may wirelessly communicate data through the human body channel 102 to a hand 110 and when the hand 110 touches a conductive device such as a door handle, the data (for example an unlocking code) is transmitted thereto. Thus, the body channel communication system 100 can transmit data by the touch of the hand 110 or a finger of the hand 110 which can be utilized for security systems, financial transaction systems, gaming systems or many other applications.

Body channel communication (BCC) systems 100 can be broadly classified into two intra-body communication channel characteristic categories: waveguide channel characteristics and electric-field channel characteristics. The type of channel characteristics exhibited by the body channel 102 is primarily determined by the ground connection of the transmitting and receiving electrodes. Waveguide channel characteristics are achieved by using two transmitter electrodes to send the signal differentially through the human body channel 102 and receive the differential signal using two receiver electrodes, while electric-field channel characteristics are obtained when both the transmitter and receiver ground electrodes are left floating. The usable bandwidth of a waveguide-type channel is from 10 kHz to 1 MHz, thus it is only suitable for low data rate applications. The electric-field type channel exhibits a band pass characteristic with a lower cut-off frequency at 40 MHz based on 6 dB attenuation and bandwidths of exceeding 60 MHz, thus electric-field type body channel communication is more suitable for high data rate applications. Although the bandwidth for electric-field channel characteristics exceeds 60 MHz, the frequency band above 80 MHz is generally avoided due to strong interferences arising from FM radio transmission. Therefore, the usable bandwidth for electric-field type body channel communication spans from 40 MHz to 80 MHz. The body channel communication system 100 in accordance with the present embodiment is an electric-field type body channel communication.

The BCC transceivers 104, 106, 108 are based on a direct digital architecture with a simple low power consumption transmitter design. The power consumption requirements for a transmitter is more stringent than that of a receiver, as typically the transmitter is either powered up wirelessly or operated with a small battery. To overcome some limitations of direct digital transceivers (i.e., data rate restrictiveness), the body channel communication 100 in accordance with the present embodiment incorporates Walsh code sequencing into the baseband transceiver architecture to spread data using a Walsh-Hadamard code. The spread data inherits the frequency selectivity and bandwidth efficient characteristics from the Walsh-Hadamard code. The frequency selective nature of the Walsh code provides the direct digital transceivers 104, 106, 108 with interference avoidance capability, while the orthogonal characteristics of the Walsh spreading code allows for summation of codes to achieve higher data rate in band limited channels. Integrating Walsh codes with the baseband transceiver architecture allows for low power, bandwidth efficient, frequency selective and high data rate implementations of direct digital BCC transceivers.

A Walsh-Hadamard code sequence is a set of orthogonal binary spreading code widely used in synchronized multiuser communication due to its linear phase and perfectly orthogonal properties. One popular application of Walsh code sequences is direct sequence code division multiple access (DS-CDMA). Apart from the orthogonal property, Walsh code sequences can also be used to directly map the digital baseband data to the required frequency. The length of a Walsh code spreading can be of any $2^n$ order, noting that signal to noise ratio (SNR) increases with increasing Walsh code orders but at the expense of decreasing the data rates. Walsh codes of different lengths can be generated using a Hadamard matrix as follows:

$$H_2 = \begin{bmatrix} 1 & 1 \\ -1 & 1 \end{bmatrix} \quad (1)$$

$$H_{2^2} = \begin{bmatrix} H_2 & H_2 \\ -H_2 & H_2 \end{bmatrix} = \begin{bmatrix} 1 & 1 & 1 & 1 \\ -1 & 1 & -1 & 1 \\ -1 & -1 & 1 & 1 \\ 1 & -1 & -1 & 1 \end{bmatrix} \quad (2)$$

$$H_{2^n} = \begin{bmatrix} H_n & H_n \\ -H_n & H_n \end{bmatrix} \quad (3)$$

Figure 2:
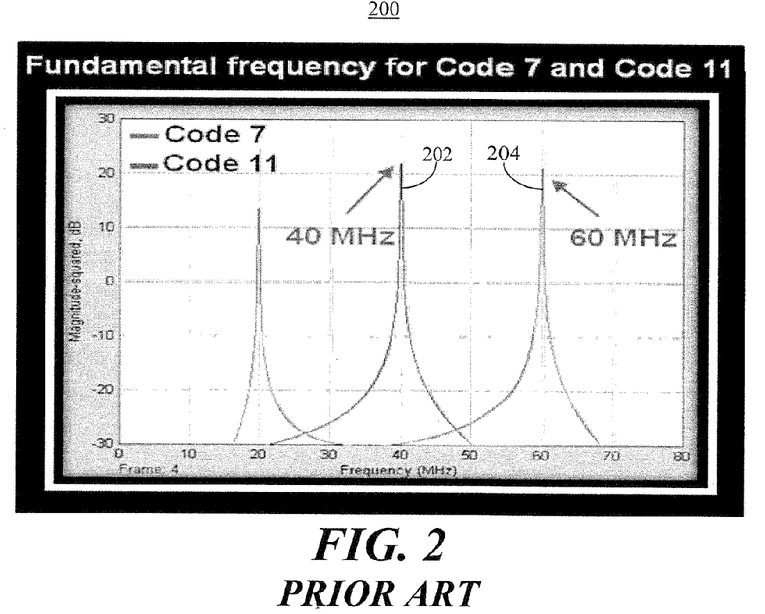
FIG. 2 depicts a graph showing the fundamental frequencies for Codes 7 and 11 of 16-bit Walsh code sequences.

A Walsh code sequence is formed by a sequence of a repetitive square pulse train constantly transiting between the high and low state at regular interval as illustrated by a 16-bit Walsh code sequence shown in Table 1. The repetitive nature of the Walsh spreading code generates a unique fundamental frequency and harmonics frequencies for each Walsh code sequence. Referring to FIG. 2, a graph 200 depicts the unique fundamental frequency 202 for Walsh code 7 and the unique fundamental frequency 204 Walsh code 11 of the 16-bit Walsh code sequence of Table 1. The fundamental frequency 202 for Walsh code 7 is 40 MHz, while the fundamental frequency 204 for Walsh code 11 is 60 MHz. The fundamental frequency for the different Walsh code sequences based on an 80 MHz clock and a 160 MHz clock are also shown in Table 1 and it is this feature of Walsh code sequences that facilitates direct up-conversion of digital baseband data to the required frequency band and provides a mechanism to avoid strong interferences.

TABLE 1

| Code | 16 bit Walsh Code Sequence | 160 MHz clock (MHz) | 80 MHz clock (MHz) |
|---|---|---|---|
| 0 | 1 1 1 1 1 1 1 1 1 1 1 1 1 1 1 1 | DC | DC |
| 1 | 1 1 1 1 1 1 1 1 -1 -1 -1 -1 -1 -1 -1 -1 | 10 | 5 |
| 2 | 1 1 1 1 -1 -1 -1 -1 -1 -1 -1 -1 1 1 1 1 | 10 | 5 |
| 3 | 1 1 1 1 -1 -1 -1 -1 1 1 1 1 -1 -1 -1 -1 | 20 | 10 |
| 4 | 1 1 -1 -1 -1 -1 1 1 1 1 -1 -1 -1 -1 1 1 | 20 | 10 |
| 5 | 1 1 -1 -1 -1 -1 1 1 -1 -1 1 1 1 1 -1 -1 | 30 | 15 |
| 6 | 1 1 -1 -1 1 1 -1 -1 -1 -1 1 1 -1 -1 1 1 | 30 | 15 |
| 7 | 1 1 -1 -1 1 1 -1 -1 1 1 -1 -1 1 1 -1 -1 | 40 | 20 |
| 8 | 1 -1 -1 1 1 -1 -1 1 1 -1 -1 1 1 -1 -1 1 | 40 | 20 |
| 9 | 1 -1 -1 1 1 -1 -1 1 -1 1 1 -1 -1 1 1 -1 | 50 | 25 |
| 10 | 1 -1 -1 1 -1 1 1 -1 -1 1 1 -1 1 -1 -1 1 | 50 | 25 |
| 11 | 1 -1 -1 1 -1 1 1 -1 1 -1 -1 1 -1 1 1 -1 | 60 | 30 |
| 12 | 1 -1 1 -1 -1 1 -1 1 1 -1 1 -1 -1 1 -1 1 | 60 | 30 |
| 13 | 1 -1 1 -1 -1 1 -1 1 -1 1 -1 1 1 -1 1 -1 | 70 | 35 |
| 14 | 1 -1 1 -1 1 -1 1 -1 -1 1 -1 1 -1 1 -1 1 | 70 | 35 |
| 15 | 1 -1 1 -1 1 -1 1 -1 1 -1 1 -1 1 -1 1 -1 | 80 | 40 |

The spectrum plot 200 is obtained based on a clock frequency of 160 MHz. However, the Walsh code system can only utilize frequency bands up to 80 MHz, as the highest fundamental frequency a Walsh code sequence can attain is half that of the clock frequency. The relationship between the clock rate, the highest fundamental frequency, the Walsh code length and the data rate is illustrated in Table 2. The length of the Walsh code has no impact on the highest fundamental frequency that a Walsh code system can reach. The highest fundamental frequency achievable is solely dependent on the clock frequency. Lowering the clock frequency or increasing the length of the Walsh code will result in a reduction of data throughput. In order for the Walsh code system to be optimized for a particular application scenario, careful selection of these four factors is required.

TABLE 2

| Walsh Length | Clock rate | Highest frequency | Data rate |
|---|---|---|---|
| 8 | 80 MHz | 40 MHz | 10 Mbps |
| 8 | 160 MHz | 80 MHz | 20 Mbps |
| 16 | 80 MHz | 40 MHz | 5 Mbps |
| 16 | 160 MHz | 80 MHz | 10 Mbps |
| 32 | 80 MHz | 40 MHz | 2.5 Mbps |
| 32 | 160 MHz | 80 MHz | 5 Mbps |

Figure 3:
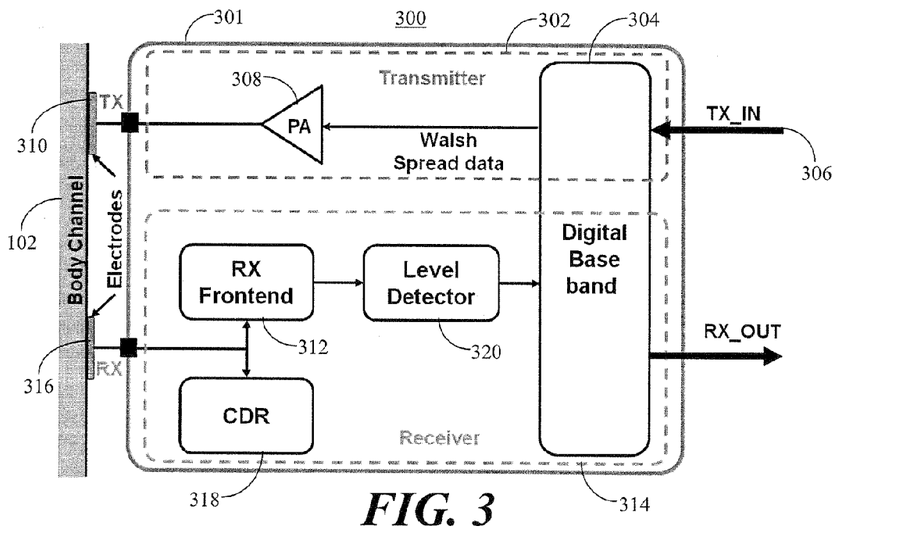
FIG. 3 depicts a block diagram of a Walsh code transceiver in accordance with a present embodiment.

Referring to FIG. 3, a block diagram 300 for a Walsh code baseband transceiver 301 in accordance with a present embodiment utilizable in the body channel communication system 100 is depicted. A transmitter portion 302 of the transceiver 301 utilizes a digital baseband block 304 to spread input data 306 with a Walsh code, followed by an amplification circuit 308 which amplifies the resultant spread signal prior to transmission of the signal through an electrode 310 to the body channel 102. A receiver frontend circuit 312 in a receiver portion 314 of the transceiver 301 is coupled to another electrode 316 and provides signal conditioning to the incoming signal. A clock and data recovery (CDR) block 318 is also coupled to the electrode 316 and recovers the clock signal, while a level detector 320 receives the conditioned signal from the receiver frontend circuit 312 and performs digitization thereof. The digitized data is fed to the digital baseband block 304 where synchronization, data de-spreading and recovery is performed.

In accordance with the present embodiment, an input clock has a predetermined frequency of 160 MHz and a 16-bit length Walsh code sequence is used to spread the input data 306. However, those skilled in the art will realize that the baseband transceiver architecture in accordance with the present embodiment is not restricted to this configuration and can be operated with different clock rates and different Walsh code sequence lengths.

In addition, the Walsh code baseband transceiver 301 in accordance with the present embodiment can operate in three modes of operation: a normal mode, a high data rate mode and a reduced power mode.

Figure 4A:
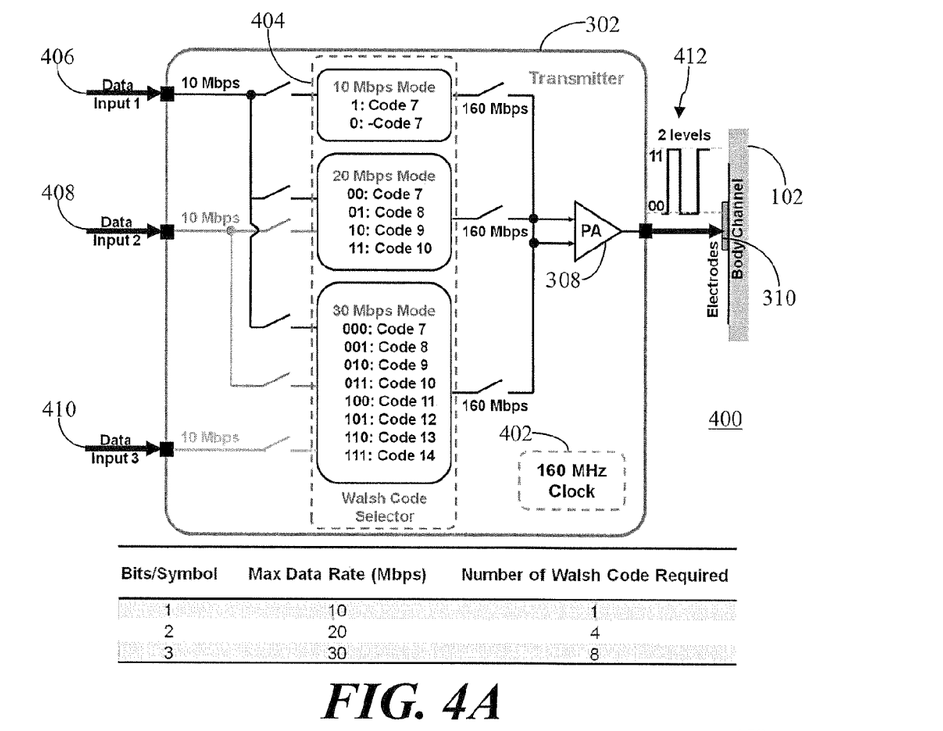
FIG. 4A depicts a block diagram of a transmitter of the transceiver of FIG. 3 during the normal mode operation and FIG. 4B depicts a graph of transmit and receive signals during the normal mode operation.
Figure 4B:
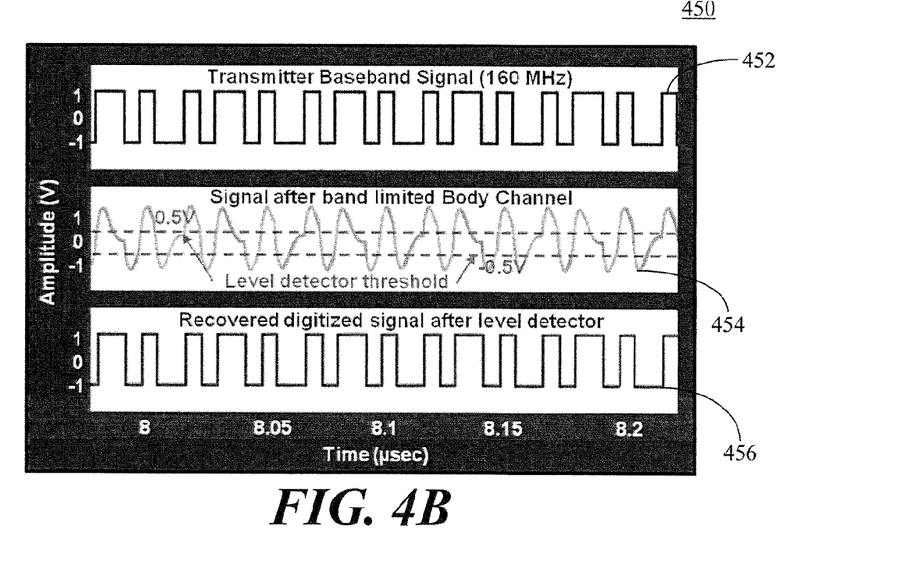

Referring to FIG. 4, including FIGS. 4A and 4B, operation in the normal mode of operation is depicted. FIG. 4A illustrates a block diagram 400 of the transmitter portion 302. In accordance with the present embodiment, a clock 402 is running at 160 MHz and is able to support data rates of 10 Mbps, 20 Mbps and 30 Mbps encoded by a Walsh code selector module 404 which is enabled within the digital baseband 304 (FIG. 3).

For a data rate of 10 Mbps, only one Walsh code is required. For example, '1' is represented by Walsh code 7, while '0' is represented by the inverse of Walsh code 7. For data rates of 20 Mbps and 30 Mbps, each Walsh code is used to represent multiple data bits as shown within the Walsh code selector module 404. Only one data input 406 to the Walsh code selector module 404 is required for 10 Mbps mode, while two inputs 406, 408 to the Walsh code selector module 404 are required for 20 Mbps mode and three inputs 406, 408, 410 to the Walsh code selector module 404 are required for 30 Mbps mode. The maximum data rate supported in the normal mode in accordance with the present embodiment is 30 Mbps as there are only nine usable Walsh codes (Walsh code 7 to Walsh code 15) in the frequency band of 40 MHz to 80 MHz. As noted hereinabove, a body channel spanning from 40 MHz to 80 MHz is most suitable for high data rate applications, thus only Walsh codes with fundamental frequencies within this band are used in accordance with the present embodiment.

Also, in the normal mode in accordance with the present embodiment, there is a flexibility of choosing between interference avoidance through the frequency selective nature of the Walsh code or supporting higher data rates by using multiple Walsh codes serially. In the normal mode, the input to a switch capacitor power amplifier of the amplification circuit (PA) 308 is either '00' or '11'. When the input is '00', the amplification circuit 308 will output a low state. Similarly, when the input is '11', the amplification circuit 308 will output a high state. The transmitted data is a two-level signal 412, which comprises of only high and low states and is shown in the graph 450 of transmit and receive signals in the normal mode operation of FIG. 4B as the transmit signal 452. The signal 454 received by the electrode 316 (FIG. 3) is recovered by, for example, using a two-level detector such as Schmitt trigger circuit in the level detector 320 (FIG. 3) to derive the signal 456.

Figure 5A:
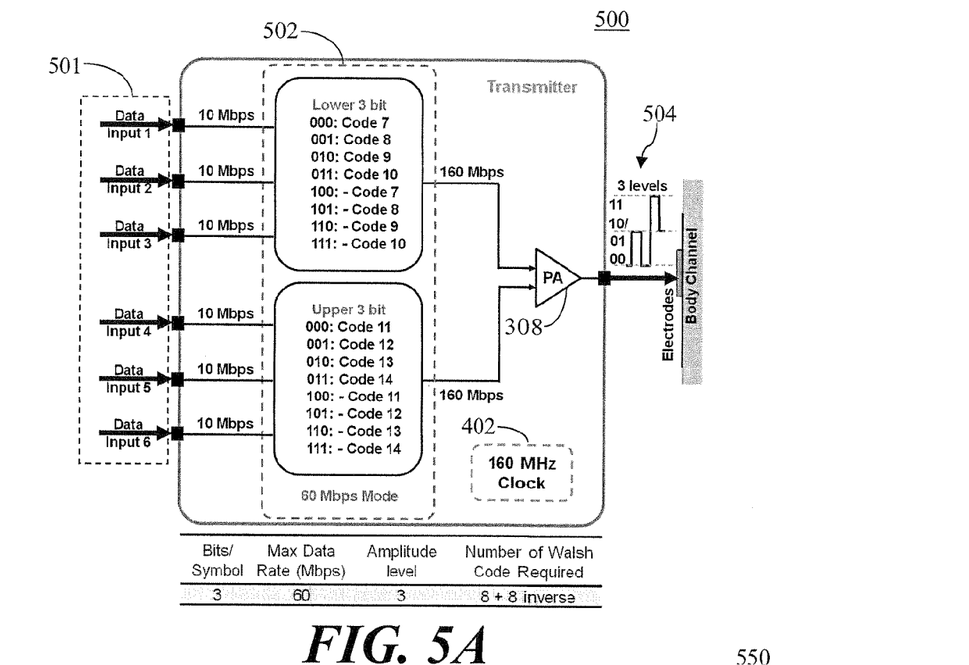
FIG. 5A depicts a block diagram of a transmitter of the transceiver of FIG. 3 during the high data rate mode operation and FIG. 5B depicts a graph of transmit and receive signals during the high data rate mode operation.
Figure 5B:
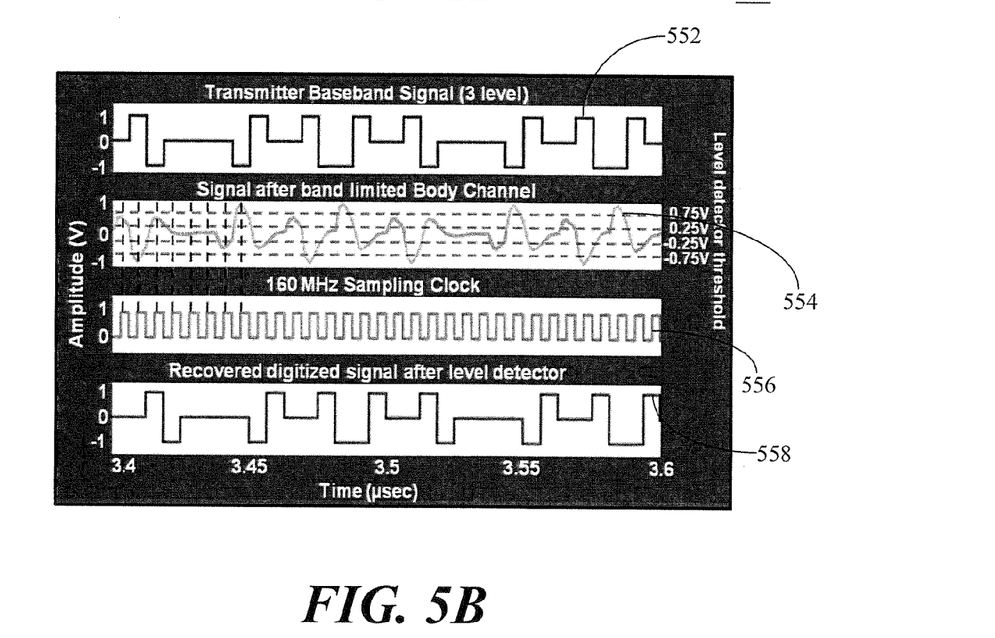

Referring to FIG. 5, including FIGS. 5A and 5B, operation in the high data rate mode of operation is depicted in accordance with the present embodiment. FIG. 5A illustrates a block diagram 500 of the transmitter portion 302 wherein the clock 402 is operating at 160 MHz and is able to support 60 Mbps of data transfer. The operating principle of the high data rate mode of operation in accordance with the present embodiment is illustrated in the diagram 500 wherein six data inputs 501 are provided to a 60 Mbps Walsh code selector module 502 which is a portion of the digital baseband 304 (FIG. 3). The lower three bits are mapped onto code 7 to code 10 while the upper three bits are mapped onto code 11 to code 14. The inverse of the Walsh codes are also used to maximize the number of usable codes in the body channel. In the high data rate mode, each Walsh code is used to represent three bits of data, and two Walsh codes are stacked together using the amplification circuit (PA) 308 to form a 3-level signal 504. FIG. 5B depicts a graph 550 of the transmit and receive signals during the high data rate mode operation, where a signal 552 is the transmitter baseband signal provided from the electrode 310 (FIG. 3), a signal 554 is the signal received at the electrode 316 (FIG. 3), a signal 556 is the sample clock signal of the level detector 320 (FIG. 3) and a signal 558 is the recovered digitized signal after processing by the level detector 320. Similar to the normal mode of operation, when the input to the PA 308 is '00' or '11', it represents the low state and high state respectively. However in the high data rate mode of operation, the input of the PA 308 can also be '01' or '10', which represents the middle level, thus forming the three level signal 504 at the output of the PA 308. By allocating multiple bits to one Walsh code and the stacking of two Walsh codes, a data rate of 60 Mbps can be achieved in accordance with the present embodiment within a 40 MHz band.

TABLE 3

| Input voltage level | Decoded Output |
|---|---|
| −25 V < SL < 0.25 V | No change |
| 0.25 V ≤ SL < 0.75 V | Inrease 1 level (previous output + 1 V) |
| −0.75 V < SL ≤ −0.25 V | Reduce 1 level (previous output − 1 V) |
| SL ≥ 0.75 V | Position peak (+1 V) |
| SL ≤ −0.75 V | Negative peak (−1 V) |

SL: Signal level

When operating in the high data rate mode, a 4-level detector is used as the level detector 320 to digitize the received signal. The digitized levels of the signal output from the level detector 320 based on the 4-level threshold is shown in Table 3. When the input signal level is within −0.25V and 0.25V, it is determined that the input signal is in the hysteresis region and the output does not change state. When the input crosses 0.25V and is below 0.75V, the output increases by one level over the previous output level (i.e. if the previous output is at −1V, the current output level will be 0V). If the input signal crosses the peak threshold of −0.75V or 0.75V, the output will take on the peak output value of −1V or 1V, respectively. The voltage level for the four thresholds is not fixed and can be varied according to the amplitude of the incoming signal.

Thus it can be seen that when the input signal is within 0.25V to 0.75V and −0.75V to −0.25V, the current output level is dependent on the previous output state. If there is an error in the previous output state, the error will get propagated down the chain until the correct output level is obtained. The output level is corrected when the input signal goes above 0.75V or below −0.75V, which occurs when the baseband signal switches from the positive peak to negative peak or vice versa as illustrated in the signal 554 of FIG. 5B. Therefore, in accordance with the present embodiment it is important to ensure the Walsh codes used for summing purposes are selected such that there is at least a switch between the positive and negative peaks within a 16-bit codeword.

Figure 6:
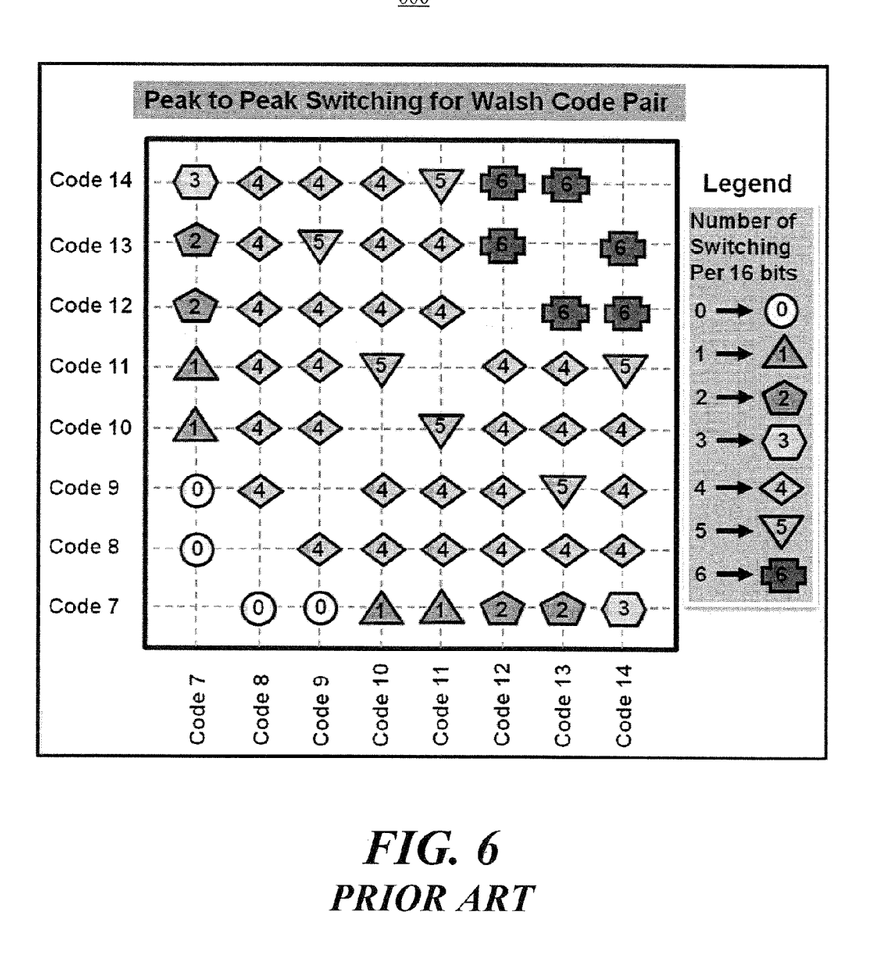
FIG. 6 depicts a chart showing the number of peak switching for different Walsh code pairs of codes 7 to 14 of the 16-bit Walsh code sequences.

The frequency of peak to peak switching occurring within a 16-bit codeword for the different Walsh code combinations is shown in FIG. 6. FIG. 6 depicts a chart 600 showing the number of peak switchings for different Walsh code pairs of codes 7 to 14 of the 16-bit Walsh code sequences. Based on the information given in the chart 600, the available Walsh codes are separated into two groups for summing purposes. The available Walsh codes are grouped according to Table 4, where those code combinations with zero or low numbers of peak to peak switching are placed in the same group.

TABLE 4

| Group 1 | Group 2 |
| --- | --- |
| Code 7 | Code 11 |
| Code 8 | Code 12 |
| Code 9 | Code 13 |
| Code 10 | Code 14 |
| Inverted Code 7 | Inverted Code 11 |
| Inverted Code 8 | Inverted Code 12 |
| Inverted Code 9 | Inverted Code 13 |
| Inverted Code 10 | Inverted Code 14 |

Figure 7A:
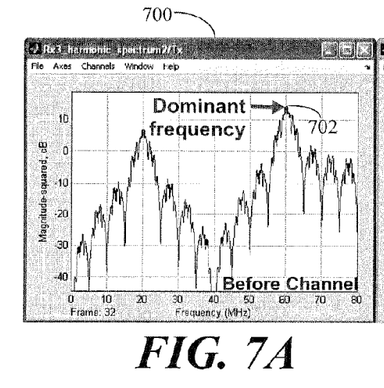
FIG. 7A depicts a graph of before channel signaling.
Figure 7B:
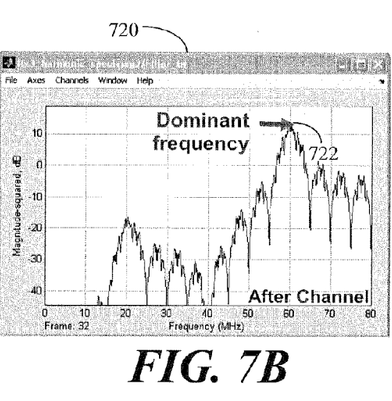
FIG. 7B depicts a graph of after channel signaling and FIG. 7C depicts a graph of the transmit and receive signals.
Figure 7C:
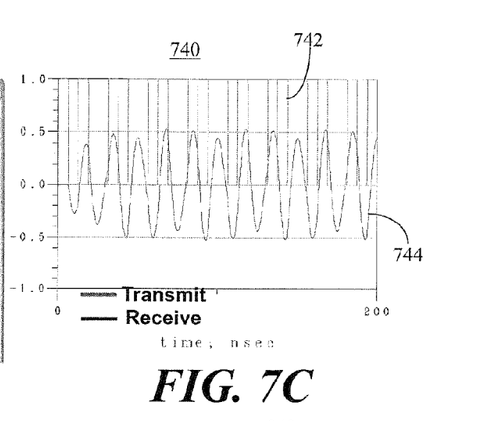

In accordance with the present embodiment, a low power mode of operation is also provided. For the low power mode, the clock frequency is reduced by fifty percent to 80 MHz and is able to support 5 Mbps of data transfer. When the clock rate is reduced to 80 MHz, the fundamental frequency shifts to below 40 MHz as illustrated in Table 1. However, due to the band pass characteristics of the body channel 102, there is higher attenuation in frequency bands below 40 MHz, which results in the harmonic frequencies being the dominant frequencies instead of the fundamental frequencies as illustrated in FIGS. 7 and 8. FIG. 7, comprising FIGS. 7A, 7B and 7C, depicts signaling of Walsh code systems clocked at a frequency of 160 MHz, wherein FIG. 7A depicts a graph 700 of before channel signaling, FIG. 7B depicts a graph 720 of after channel signaling and FIG. 7C depicts a graph 740 of the transmit signal 742 and the receive signal 744. Note that the dominant frequency 702, 722 is 60 MHz in both the before channel signaling (the graph 700) and the after channel signaling (the graph 720).

Figure 8A:
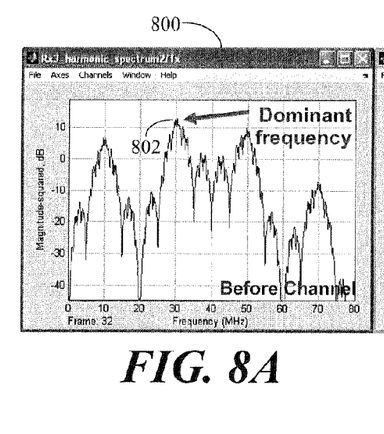
FIG. 8A depicts a graph of before channel signaling in accordance with the present embodiment.
Figure 8B:
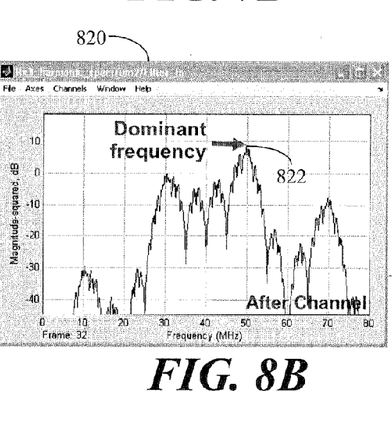
FIG. 8B depicts a graph of after channel signaling in accordance with the present embodiment and FIG. 8C depicts a graph of the transmit and receive signals in accordance with the present embodiment.
Figure 8C:
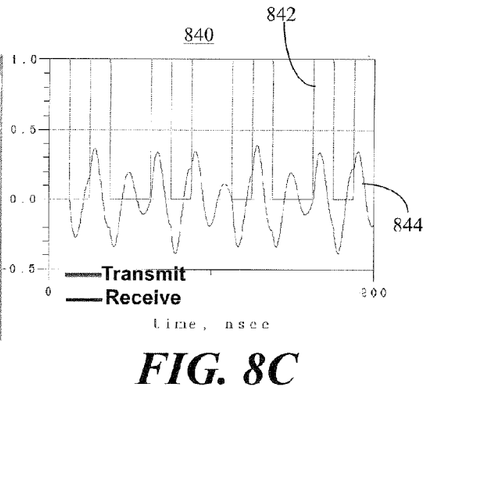

Referring to FIG. 8, comprising FIGS. 8A, 8B and 8C, a low power mode with reduced clock rate signaling of the Walsh code system in accordance with the present embodiment is depicted when clocked at a reduced clock rate of 80 MHz. FIG. 8A depicts a graph 800 of before channel signaling in accordance with the low power mode of the present embodiment, FIG. 8B depicts a graph 820 of after channel signaling in accordance with the low power mode of the present embodiment and FIG. 8C depicts a graph 840 of the transmit signal 842 and the receive signal 844 in accordance with the low power mode of the present embodiment. The fundamental frequency for Walsh Code 11 in the reduced clock rate configuration is 30 MHz (the dominant frequency 702 in the graph 700) with a harmonic frequency at 50 MHz. As the signal passes through the electric-field body channel, the fundamental frequency gets attenuated and results in the harmonic frequency at 50 MHz becoming the dominant frequency 722 in the graph 720.

Figure 9:
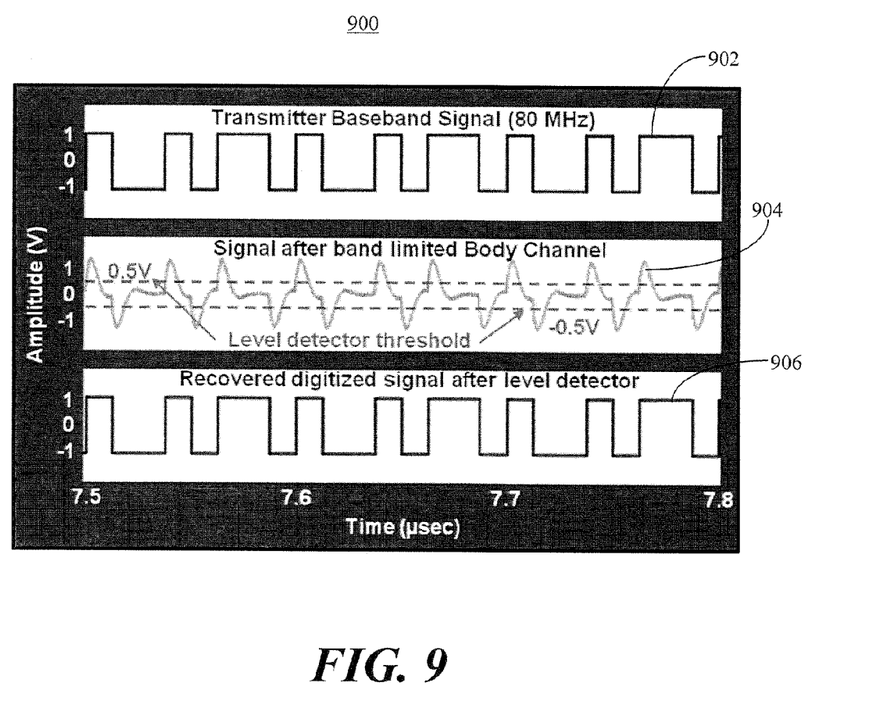
FIG. 9 depicts a graph of the transmit and receive signals when operating in a reduced power mode in accordance with the present embodiment.

The time domain plot for low power mode is shown in FIG. 9. FIG. 9 depicts a graph 900 of the transmit signal 902, the receive signal 904 and the recovered receive signal 906 when operating in the reduced power mode in accordance with the present embodiment. Similar to the normal operation mode, the harmonic frequency dominated signal can be recovered using a 2-level detector. The key advantage of using a reduced clock rate is power consumption reduction. In a direct digital baseband system, the more power hungry blocks in the transmitter are the digital baseband block and power amplifier block. By reducing the clock rate, significant power saving can be realized. Table 5 shows the current consumption breakdown for a typical Walsh code baseband transmitter evidencing that a power reduction of 41% can be realized by lowering the clock rate by 50%. This low power mode allows the power consumption to be reduced for applications with data rates less than 5 Mbps.

TABLE 5

| Power Domain | Typical Current Consumption | Reduced power mode | % Power Reduction |
| --- | --- | --- | --- |
| Power management | 10 µA | 10 µA | — |
| CDR | 2.2 µA | 2.2 µA | — |
| PLL | 300 µA | 300 µA | — |
| Baseband | 900 µA | 450 µA | 50% |
| Switch Cap. PA | 600 µA | 300 µA | 50% |
| Overall | 1.8 mA | 1.06 mA | 41% |

Thus, in accordance with the present embodiment, three modes of operation that support high data rate operation and reduced power operation for baseband body channel communication are presented. The unique features of the Walsh code baseband transceiver in accordance with the present invention are stacking of Walsh code in direct baseband transmission system without up-converting the signal in a high data rate mode of operation and using harmonics energy to recover the signal in a low power mode of operation. The key features for the different modes of operation are summarized in Table 6. In accordance with the present embodiment, these three modes can be supported using the same transmitter and receiver architecture. The only reconfiguration required is in the digital baseband block.

TABLE 6

| Operation Mode | Clock rate (MHz) | Data rate (Mbps) | Walsh code Used | No. of Levels | Power reduction (%) |
|---|---|---|---|---|---|
| Normal | 160 | 10/20/30 | 1/4/8 | 2 level | — |
| High data rate | 160 | 60 | 8 + 8 | 4 level | — |
| Low power | 80 | 5 | 1 | 2 level | 41% |

Figure 10A:
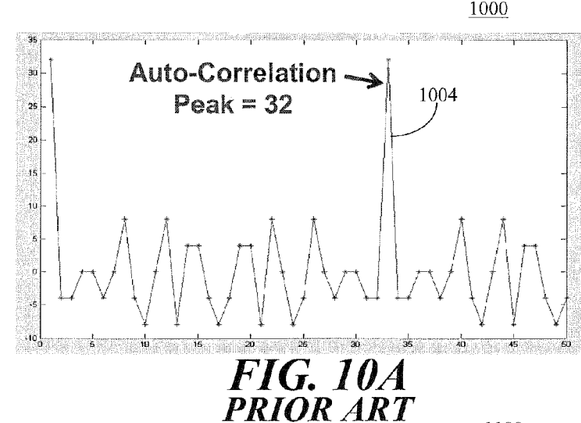
FIG. 10A depicts a graph of the conventional 32-bit M-sequence code signal before filtering and FIG. 10B depicts a graph of the conventional 32-bit M-sequence code signal after filtering.
Figure 10B:
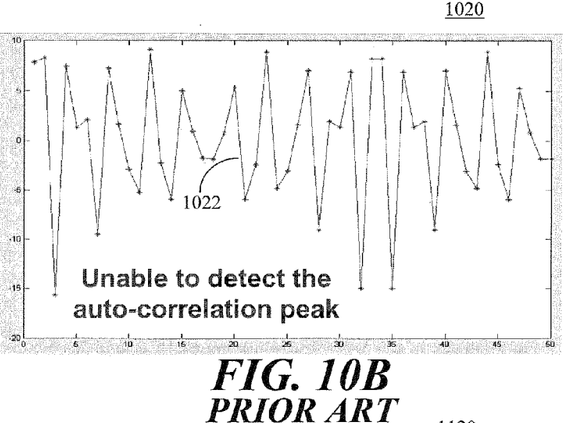

Walsh code sequences have a good cross-correlation property but a poor auto-correlation property. Therefore, Walsh code sequences are not suitable to be used for synchronization. Codes with good auto-correlation properties, such as M-Sequence codes, are commonly used for synchronization. However, M-Sequence codes cannot be applied directly to a baseband transceiver system for band limited channels such as body channel, as the good auto-correlation property of the code is loss when filtered by the channel as illustrated in FIG. 10. FIG. 10, comprising FIGS. 10A and 10B, depicts a conventional 32-bit M-sequence code for synchronization, wherein FIG. 10A depicts a graph 1000 of a conventional 32-bit M-sequence code signal 1002 before filtering and FIG. 10B depicts a graph 1020 of the conventional 32-bit M-sequence code signal 1022 after filtering. Before the 32-bit M-Sequence code propagates through the channel, a distinct auto-correlation peak 1004 can be detected. After the M-sequence code travels through the band limited channel, the auto-correlation peak can no longer be detected. In conventional RF system, the M-sequence code is up-converted to the desired frequency band using some form of mixing circuit in order to retain the good auto-correlation property. However, no up-conversion is performed in the baseband system in accordance with the present embodiment, and thus the good auto-correlation property is diminished when a large portion of its frequency components are removed when passing through the band limited body channel 102.

Figure 11A:
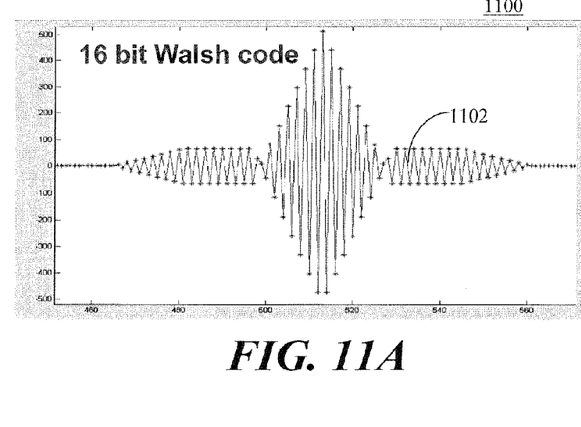
FIG. 11A depicts a graph of the M-sequence code combined with a sixteen bit Walsh code in accordance with the present embodiment and FIG. 11B depicts a graph of the M-sequence code combined with a four bit Walsh code in accordance with the present embodiment.
Figure 11B:
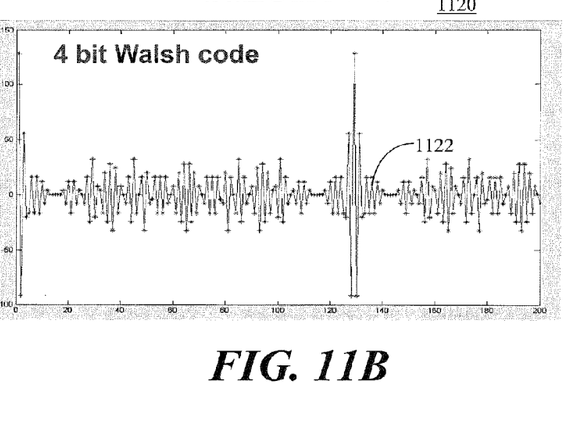

To overcome this limitation the present embodiment modulates the M-Sequence code with the Walsh code. By modulating the M-Sequence code with the Walsh code, the frequency selective property of the Walsh code is incorporated into M-Sequence code and allows the signal to retain its good auto-correlation property while passing through the band limited channel Referring to FIG. 11, comprising FIGS. 11A and 11B, a 32-bit M-sequence code combined with a Walsh code for synchronization in accordance with the present embodiment is depicted. FIG. 11A depicts a graph 1100 of the M-sequence code combined with a sixteen bit Walsh code in accordance with the present embodiment. Graph 1100 illustrates a signal 1102 for an auto-correlation result of the 128-bit combined synchronisation code through a band limited 40 MHz to 80 MHz channel. The 128-bit synchronisation code is formed by replacing each bit of the 32-bit M-Sequence code with a sixteen bit Walsh code. Similarly, FIG. 11B depicts a graph 1120 of the M-sequence code combined with a four bit Walsh code in accordance with the present embodiment. Graph 1120 illustrates a signal 1122 of the auto-correlation result for the 128-bit combined synchronisation code through a band limited 40 MHz to 80 MHz channel when the 128-bit synchronisation code is formed by replacing each bit of the 32-bit M-Sequence code with a four bit Walsh code. From the auto-correlation graphs 1100, 1120, it can be seen that by combining an M-sequence code with the Walsh code, the auto-correlation peak is successfully detected after passing the band limited channel.

Figure 12:
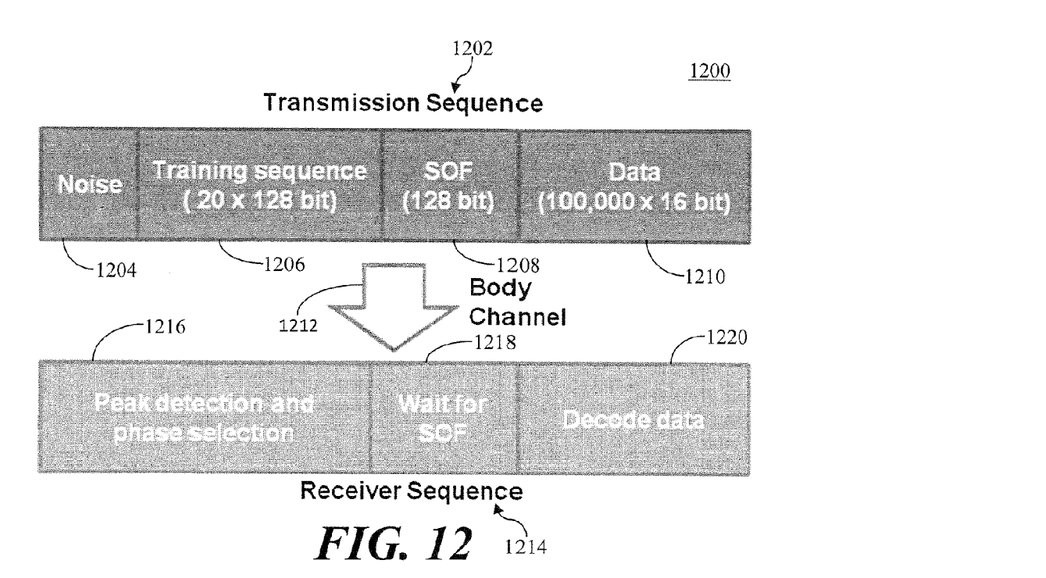
FIG. 12 depicts a body channel communication setup for simulation of operation in accordance with the present embodiment.

In order to test the performance for the three operation modes according to the present embodiment a simulation was performed using MATLAB based on a measurement setup 1200 depicted in FIG. 12 and comparison was made using the bit error rate (BER) index. On the transmitter side, a transmission sequence 1202 transmits a training sequence 1206 after a random delay 1204. During the delay period 1204, random data that resembles noise signal are transmitted. The training sequence 1206 consists of twenty 128-bit synchronization codes, which is formed by a 32-bit M-Sequence code combined with a four bit Walsh code. The purpose of the training sequence 1206 is to allow the receiver to identify the correct phase and achieve synchronization with the transmitter. The start of frame (SOF) sequence 1208 provides information on the timing of data arrival, followed by 100,000 bits of data 1210 modulated with a 16-bit Walsh code. Simulation of passing this signal though a body channel 1212 is performed and a receiver sequence 1214 is generated. On the receiver end, the first step 1216 is to achieve the correct phase and synchronization through peak detection and phase selection using the received training sequence 1206. Once synchronization 1216 is obtained, the receiver will start searching for the SOF sequence 1218. When the SOF sequence 1218 is found, data decoding process 1220 commences. A bit error rate is computed from the decoded data 1220.

Figure 13:
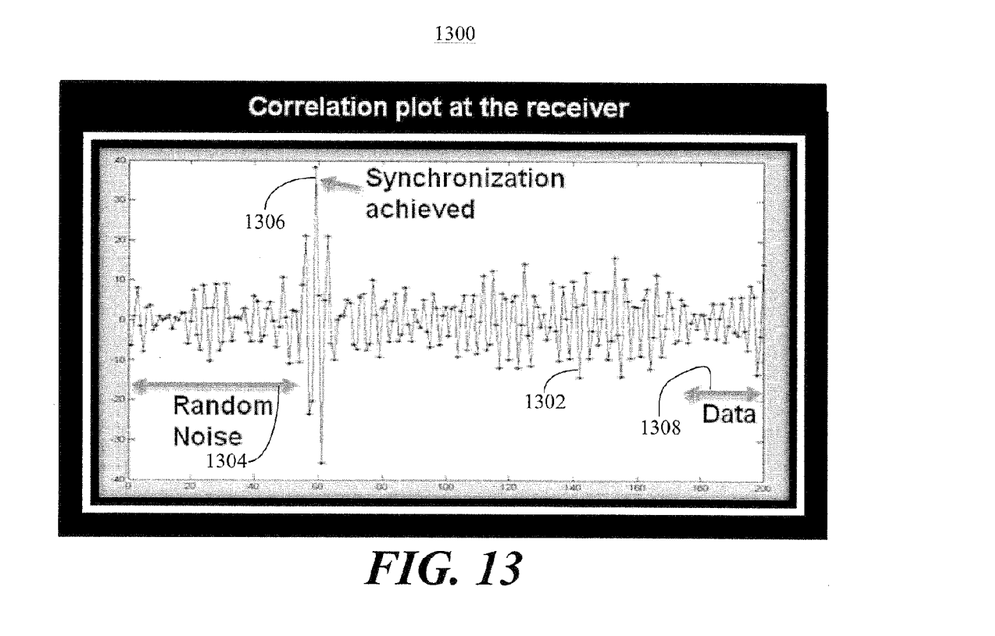
FIG. 13 depicts a graph of the correlation plot at the receiver in the simulation of operation of FIG. 12 in accordance with the present embodiment.

Referring to FIG. 13, a graph 1300 depicts a correlation plot of the received signal 1302 at the receiver in the simulation of operation of FIG. 12 in accordance with the present embodiment. A random duration of noise 1304 is detected before synchronization 1306 is successfully achieved using a combination of M-Sequence and Walsh code. After synchronization 1306 is achieved and SOF detected, data 1308 decoding commences.

Figure 14:
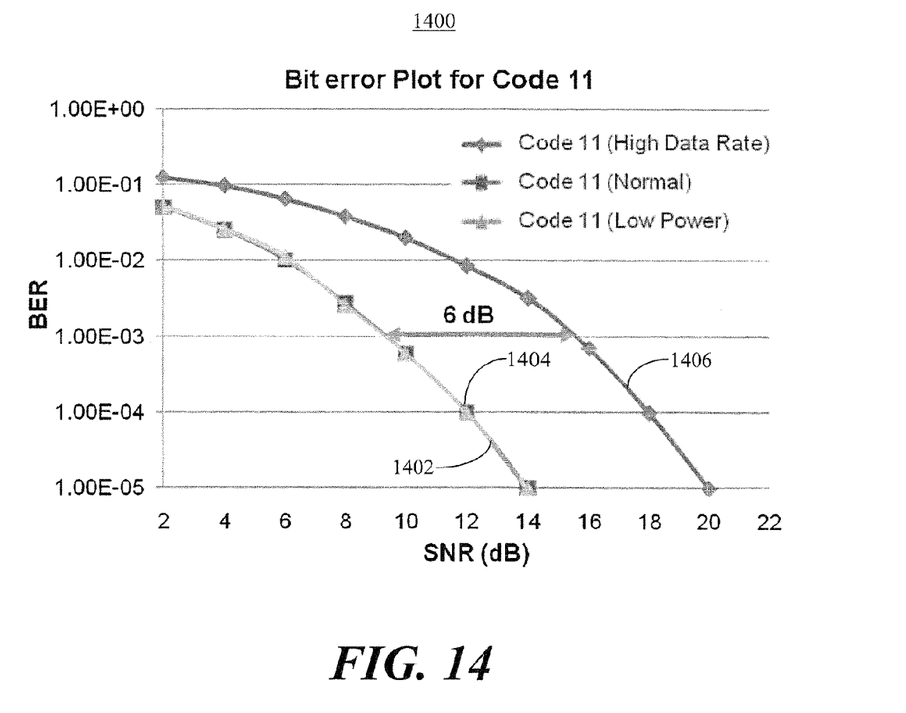
FIG. 14 depicts a graph of bit error rate performance when operating in normal mode, reduced power mode and high data rate mode in accordance with the present embodiment.

FIG. 14 depicts a graph 1400 of bit error rate performance when operating in normal mode on line 1402, reduced power mode on line 1404 and high data rate mode on line 1406 in accordance with the present embodiment. There is no performance degradation between the normal mode 1402 and the low power mode 1404. The lowering of clock rate to 80 MHz reduces the data rate by 50% but maintains similar BER performance as in the normal mode. Therefore, operating in low power mode for low data rate applications below five Mbps can lead to significant power saving without the penalty of performance degradation. The high data rate mode 1406 requires SNR to be six dB higher than normal mode in order to achieve a similar BER of $10^{-3}$. Stacking two codes on top of each other increases the data throughput at the expense of lower dynamic range, thus requiring higher SNR. The high data rate mode provides an option to increase the data throughput during good channel conditions when the transmitter and receiver electrodes are placed proximate to each other.

Thus, in accordance with the present embodiment, a versatile baseband Walsh code transceiver system for body channel communication is proposed with a transceiver that supports both reduced power operation and high data rate operation. In the low power mode, the current consumption for the transmitter can be lowered to approximately 1 mA, while supporting a data rate of 5 Mbps. In good channel conditions, data throughput can be increased to 60 Mbps through multi-level coding schemes. The low power and high data rate operation are achieved through two unique implementations of the Walsh code baseband system. The first unique feature is the code stacking in direct baseband system to enhance the data throughput. The second feature is the use of harmonics to reduce the clock frequency and thereby lead to lower power consumption. Frequency selective synchronization codes that can be applied to direct baseband system combine Walsh code with M-Sequence code to preserve the good auto-correlation property of M-sequence code while propagating through a band limited channel.

Thus, it can be seen that a system and method for body channel communication baseband transceiver operation that supports both low power and high data rate modes while operating in the electric-field intra-body channel (40 MHz to 80 MHz) has been provided. While exemplary embodiments have been presented in the foregoing detailed description of the invention, it should be appreciated that a vast number of variations exist.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A system for body channel communication comprising:
  a direct digital transmitter comprising:
    a Walsh code selector module having a normal data rate mode of operation and a high data rate mode of operation, wherein the Walsh code selector module when operating in the normal data rate mode encodes one or more bits of digital baseband data per symbol by selecting a first Walsh code from a multiple-bit Walsh code sequence for each symbol to arrive at a two-level symbol stream, and wherein the Walsh code selector module when operating in the high data rate mode encodes multiple bits per symbol by selecting the first Walsh code selected from the multiple-bit Walsh code sequence in response to a first set of multiple bits of the digital baseband data and selecting a second Walsh code having a same bit length as the first Walsh code and selected from the multiple-bit Walsh code sequence in response to a second set of multiple bits of the digital baseband data, and wherein the Walsh code selector module is configured to operate at a predetermined symbol frequency in the high data rate mode of operation, and wherein the Walsh code selector module maintains a same number of bits of the multiple-bit Walsh code sequence when switching from the normal data rate mode to the high data rate mode to map the digital baseband data to the predetermined symbol frequency;
    an amplification circuit coupled to the Walsh code selector module and having a normal data rate mode and a high data rate mode, and when operating in the normal data rate mode the amplification circuit generates a multi-level transmission signal having the predetermined symbol frequency in response to the two-level symbol stream, and when operating in the high data rate mode the amplification circuit receives the first Walsh code and the second Walsh code and generates therefrom a multi-level transmission signal having the predetermined symbol frequency by stacking the first Walsh code onto the second Walsh code; and
    an electrode coupled to a body channel for transmitting the multi-level transmission signal having the predetermined symbol frequency through the body channel; and
  a direct digital receiver comprising:
    an electrode coupled to the body channel for receiving the multi-level transmission signal having the predetermined symbol frequency therefrom;
    a level detector coupled to the electrode for detecting levels of the multi-level transmission signal having the predetermined symbol frequency; and
    a digital baseband for deriving the first set of multiple bits of the digital baseband data and the second set of multiple bits of the digital baseband data from the levels of the multi-level transmission signal having the predetermined symbol frequency.

2. The system in accordance with claim 1 wherein the predetermined symbol frequency is 160 MHz.

3. The system in accordance with claim 1 wherein the multi-level transmission signal is a three-level symbol signal.

4. The system in accordance with claim 1 wherein the first set of multiple bits of the digital baseband data is a first set of three bit data and the second set of multiple bits of the digital baseband data is a second set of three bit data, and wherein the multiple-bit Walsh code equence is a 16-bit Walsh code sequence and the first Walsh code and the second Walsh code are selected in response to the first set of three-bit data and the second set of three-bit data, respectively.

5. The system in accordance with claim 4 wherein the first Walsh code and the second Walsh code include inverse Walsh codes selected from the 16-bit Walsh code sequence.

6. The system in accordance with claim 1 wherein the digital baseband derives the first set of multiple bits and the second set of multiple bits from the signal having the predetermined symbol frequency during a low power mode of operation in response to harmonic energy from a harmonic frequency generated by the multiple-bit Walsh code sequence.

7. The system in accordance with claim 1 wherein the Walsh code selector further modulates an M-Sequence code with the multi-bit Walsh code sequence up to a desired frequency band associated with the predetermined frequency.

8. A direct digital transmitter for body channel communication comprising:
  a Walsh code selector module having a normal data rate mode of operation and a high data rate mode of operation, and wherein the Walsh code selector module when operating in the normal data rate mode encodes one or more bits of digital baseband data per symbol by selecting a first Walsh code from a multiple-bit Walsh code sequence for each symbol to arrive at a two-level symbol stream, and wherein the Walsh code selector module when operating in the high data rate mode encodes multiple bits of the digital baseband data per symbol by selecting the first Walsh code selected from the multiple-bit Walsh code sequence in response to a first set of multiple bits of data and selecting a second Walsh code having a same bit length as the first Walsh code and selected from the multiple-bit Walsh code sequence in response to a second set of multiple bits of data, and wherein the Walsh code selector is configured to operate at a predetermined symbol frequency in both the normal data rate mode of operation and the high data rate mode of operation to map the digital baseband data to the predetermined symbol frequency, and wherein the Walsh code selector module maintains a same number of bits of the multiple-bit Walsh code sequence when switching from the normal data rate mode to the high data rate mode to map the digital baseband data to the predetermined symbol frequency;

an amplification circuit coupled to the Walsh code selector module and having a normal data rate mode and a high data rate mode and when operating in the normal data rate mode the amplification circuit generates the multi-level transmission signal having the predetermined symbol frequency in response to the two-level symbol stream and when operating in the high data rate mode the amplification circuit receives the first Walsh code and the second Walsh code and generates therefrom a multi-level transmission signal having the predetermined symbol frequency by stacking the first Walsh code onto the second Walsh code; and an electrode coupled to a body channel for transmitting the signal having the predetermined symbol frequency through the body channel to a digital receiver, the digital receiver comprising:

an electrode coupled to the body channel for receiving the multi-level transmission signal having the predetermined symbol frequency therefrom;

a level detector coupled to the electrode for detecting levels of the multi-level transmission signal having the predetermined symbol frequency; and a digital baseband for deriving the first set of multiple bits of the digital baseband data and the second set of multiple bits of the digital baseband data from the levels of the multi-level transmission signal having the predetermined symbol frequency.

9. The transmitter in accordance with claim 8 wherein the predetermined symbol frequency is 160 MHz.

10. The transmitter in accordance with claim 8 wherein the multilevel transmission signal is a three-level symbol signal.

11. The transmitter in accordance with claim 8 wherein the first set of multiple bits of data is a first set of three bit data and the second set of multiple bits of data is a second set of three bit data, and wherein the multiple-bit Walsh code sequence is a 16-bit Walsh code sequence and the first Walsh code and the second Walsh code are selected from the 16-bit Walsh code sequence in response to the first set of three bit data and the second set of three bit data, respectively.

12. The transmitter in accordance with claim 11 wherein the first Walsh code and the second Walsh code include inverse Walsh codes selected from the 16-bit Walsh code sequence.

13. The transmitter in accordance with claim 8 wherein the Walsh code selector further modulates an M-Sequence code with the multi-bit Walsh code sequence up to a desired frequency band associated with the predetermined symbol frequency.

* * * * *